United States Patent [19]

Liu et al.

[11] 4,012,849
[45] Mar. 22, 1977

[54] EDUCATIONAL QUIZ AND ANSWER TOY

[76] Inventors: Hsing-Ching Liu; Lan-dih Liu, both of 3F, No. 213, Chuong Ching N. Road, Taipei, China /Taiwan

[22] Filed: Sept. 18, 1975

[21] Appl. No.: 614,519

[52] U.S. Cl. .............................................. 35/9 R
[51] Int. Cl.² ......................................... G09B 3/06
[58] Field of Search ..................... 35/9 R, 9 A–9 E, 35/39, 71, 73, 35 D

[56] References Cited

UNITED STATES PATENTS

| | | | |
|---|---|---|---|
| 1,599,156 | 9/1926 | Wilnin et al. | 35/9 R X |
| 1,619,160 | 3/1927 | Steele | 35/9 R |
| 1,862,872 | 6/1932 | Vincent | 35/9 R X |
| 2,742,713 | 4/1956 | Villanueva | 35/9 R |
| 3,318,023 | 5/1967 | Myers | 35/35 D |
| 3,362,103 | 1/1968 | Neumann | 35/9 R X |
| 3,902,256 | 9/1975 | Liu | 35/9 D |

*Primary Examiner*—Richard J. Apley

[57] ABSTRACT

An educational toy comprising an elongated base portion, a cylinder extending longitudinally of the base portion having a plurality of protrusions around its outer periphery extending outwardly in different radial directions, a shaft retained inside said cylinder having a front end and a rear end extending from said cylinder and means permitting it to slide with respect to said cylinder and to rotate together therewith, at least one upwardly extending setting guide member on said cylinder, a first series and a second series of a plurality of push rods longitudinally spaced along said base portion having transverse lever arms extending over the said protrusions on said cylinder, each rod being surrounded by a compressible spring at a section between its lever arm and the bottom of the base portion, a changeable quiz and answer combination card having at least one setting hole for engagement with said at least one guide member for setting the card in place on the said base portion and said cylinder in a position such that said protrusions are in a predetermined arrangement related to said lever arms and card, said card having a plurality of questions associated with said first series of push rods and corresponding answers associated with said second series of push rods but in different order, and indicating means operatively connected with said shaft, whereby only when said first and second series of push rods are sequentially and alternately pushed to match the questions with the correct answers will the lever arms act on said protrusions to rotate said cylinder and shaft sufficiently to cause said indicator to give an indication that all answers are correct.

9 Claims, 6 Drawing Figures

EDUCATIONAL QUIZ AND ANSWER TOY

The present invention relates to a novel educational toy and more particularly, to an educational toy which will give an affirmative indication after a sequential operation for correct selection of corresponding quizzes and answers prearranged on a combination card is finished.

One of the present joint inventors has filed various U.S. Pat. applications concerning educational toys, for example, No. 457,172 of "Educational Quiz and Answer Toy with Action", now U.S. Pat. No. 3,902,256, Ser. No. 557,956 of "Educational Toy Clock with Action" and Ser. No. 602,964 of "Educational Toy".

Now, the inventors further provide a novel educational toy of a different type from that of the above-mentioned invention.

The educational toy according to the present invention comprises an elongated base portion, a cylinder extending longitudinally of the base portion having a plurality of protrusions around its outer periphery extending outwardly in different radial directions, a shaft retained inside said cylinder having a front end and a rear end extending from said cylinder and means permitting it to slide with respect to said cylinder and to rotate together therewith, at least one upwardly extending setting guide member on said cylinder, a first series and a second series of a plurality of push rods longitudinally spaced along said base portion having transverse lever arms extending over the said protrusions on said cylinder, each rod being surrounded by a compressible spring at a section between its lever arm and the bottom of the base portion, a changeable quiz and answer combination card having at least one setting hole for engagement with said at least one guide member for setting the card in place on the said base portion and said cylinder in a position such that said protrusions are in a predetermined arrangement related to said lever arms and card, said card having a plurality of questions associated with said first series of push rods and corresponding answers associated with said second series of push rods but in different order, and indicating means operatively connected with said shaft, whereby only when said first and second series of push rods are sequentially and alternately pushed to match the questions with the correct answers will the lever arms act on said protrusions to rotate said cylinder and shaft sufficiently to cause said indicator to give an indication that all answers are correct.

The said shaft is provided with a multi-bladed plate at one end and a notched disc at the other end. Further, this toy is also provided with a stop means with a stepwise member in cooperation with the said multi-bladed plate so that the latter can be rotated in only one direction. On the other hand, an indicator with a post is provided, so that when the said notch on the said notched disc is turned up-side vertically, the said post will drop into the said notch and at the same time an affirmative indication of answers is shown.

Hence, it is a primary object of the present invention to provide an afore-mentioned educational toy having relative simple construction, low production cost and no substantial trouble, yet great fun as well as effective educational results can be achieved.

Other objects and advantages will become apparent from the following description with reference to the accompanying drawings, in which FIG. 1 is a perspective view of a preferred embodiment according to the present invention, with parts broken away;

Figure 1:
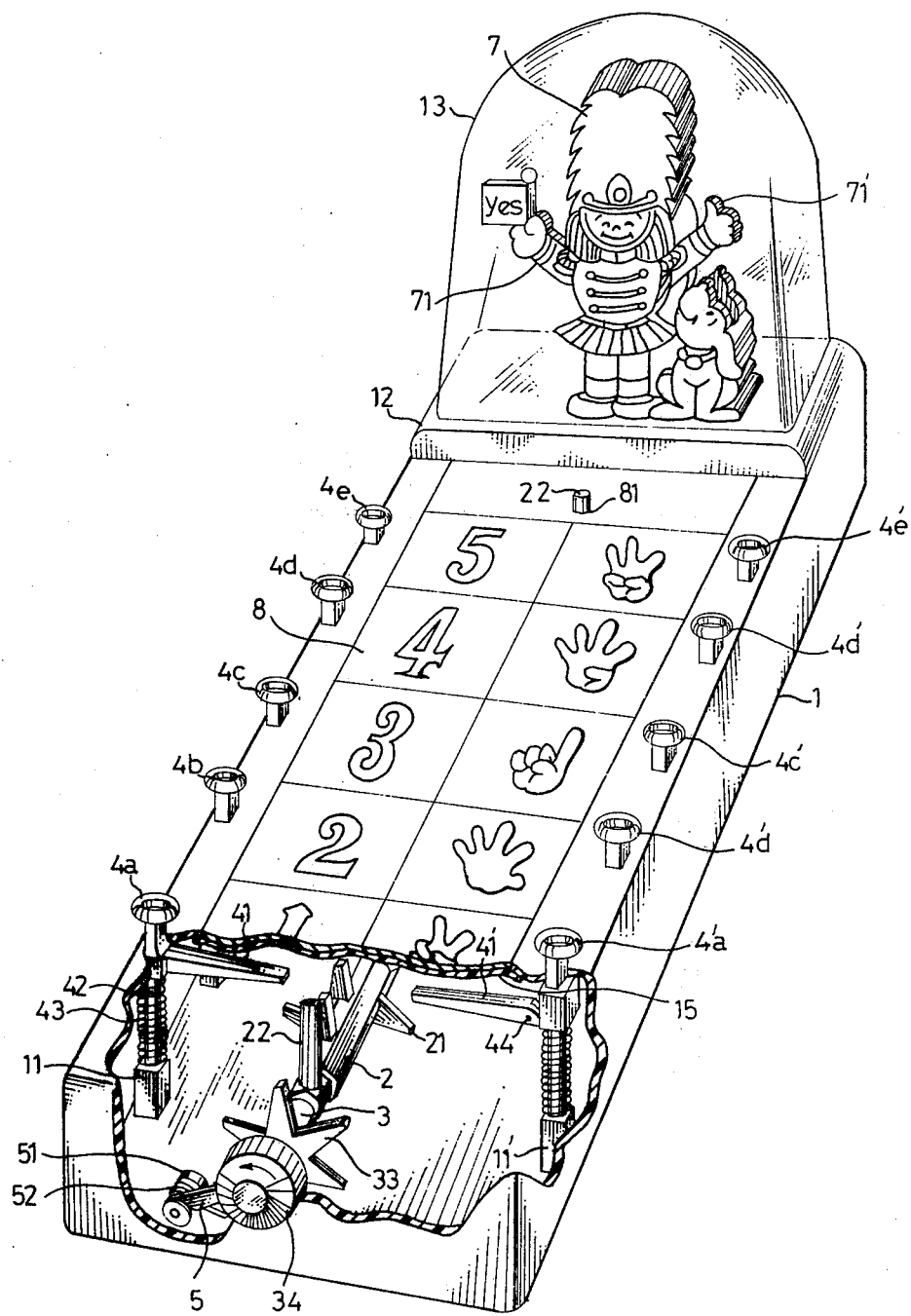
Figure 2:
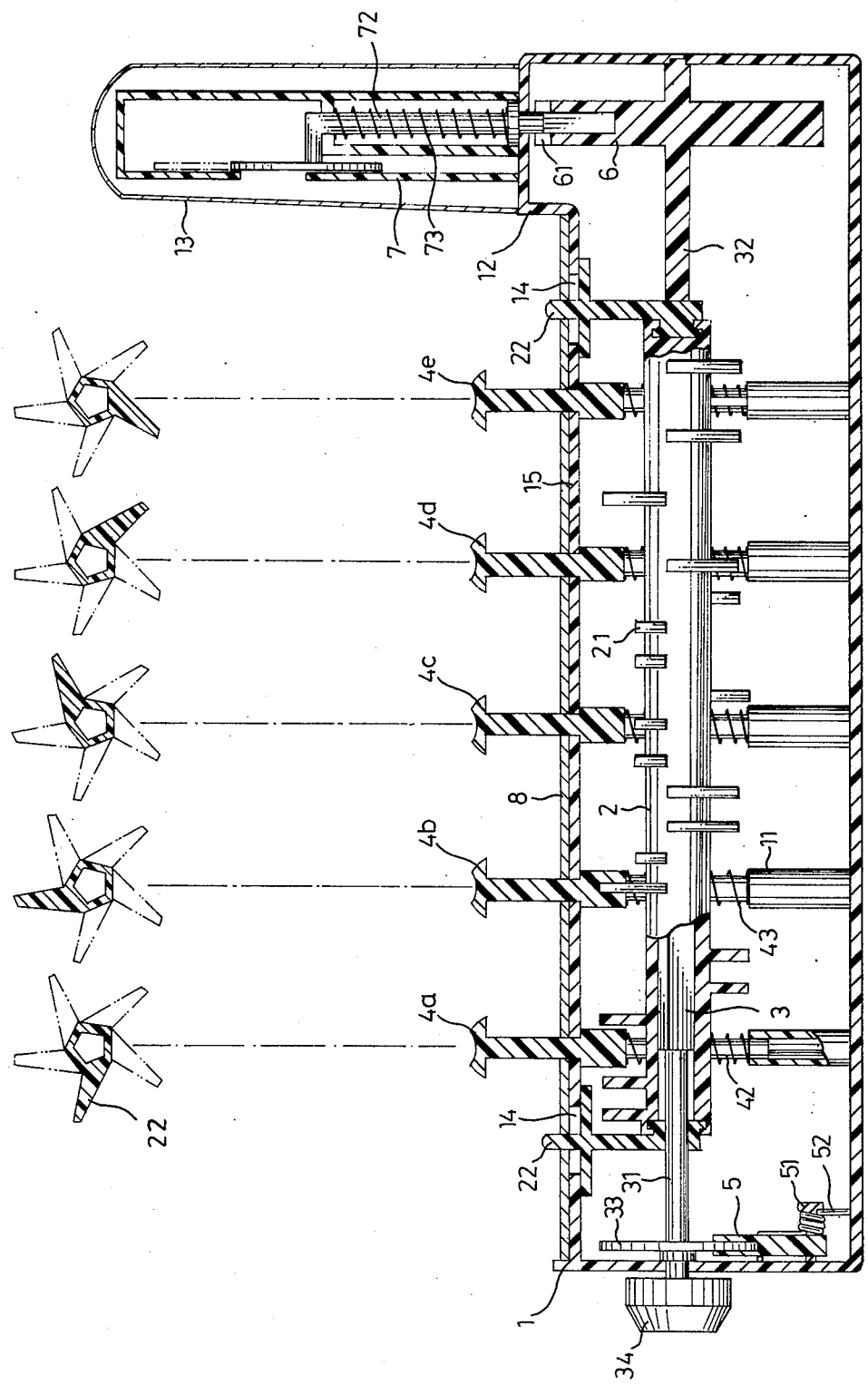
FIG. 2 is a longitudinal side elevation of FIG. 1 with parts in cross-section, and illustrating the transverse cross-section of the cylinder at every position corresponding to each push rod of one of the two series.
Figure 3:
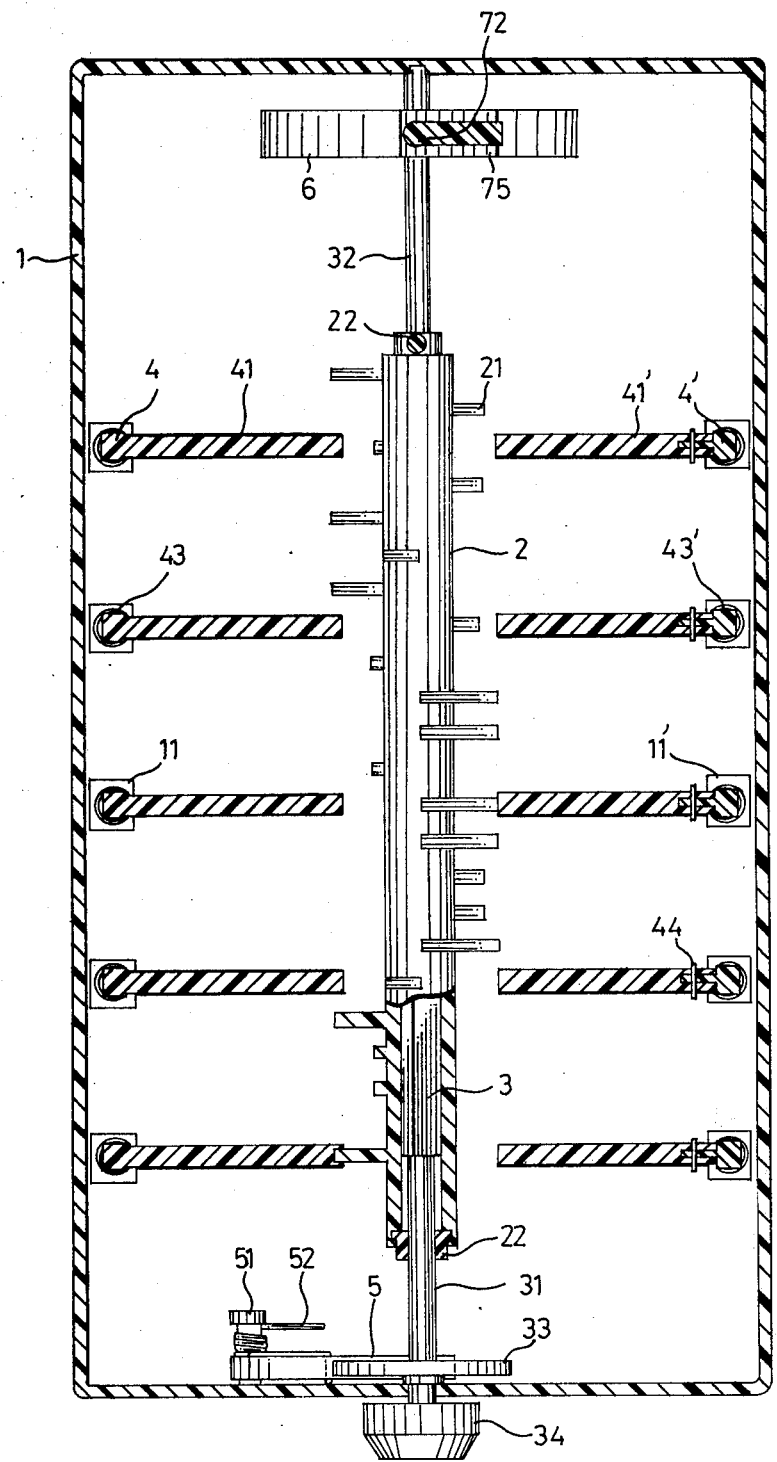
FIG. 3 is a plane view for illustrating the arrangement inside the base portion of FIG. 1, with parts in cross-section.

Now, with reference to FIGS. 1 to 3, the novel educational toy according to present invention mainly comprises a base portion 1, a cylinder 2, a shaft 3, a plurality of push rods in two series 4 and 4', a stop means 5, a notched disc 6, an indicator 7 and a changeable quiz and answer combination card 8.

The base portion 1 as shown in FIG. 1 has an elongated box configuration, but other variable types are also available, and the invention is not limited to the illustrative model. On the bottom of the base portion 1, there are provided two series of a plurality of hollow studs 11 and 11' disposed along two longitudinal sides thereof at about the same distance apart. At the rear side of the base portion 1 is formed a platform 12 to support a figure indicator 7, and if so desired, a transparent protection housing 13 for the same is be provided.

The cylinder 2 is preferably of polygonal cross-section, at least on the inner periphery, and a pentagonal cross-section is most preferred. A plurality of outwardly extended protrusions 21 are provided around its outer periphery in different radial directions. The said protrusions 21 may be in the form of blades or other suitable type. The said radial direction is varied sequentially irregularly which is deliberately pre-arranged to cooperate with the combination card 8, as will be described hereinafter.

The shaft 3 is retained inside the said cylinder 2, and preferably has the same polygonal cross-section on its outer periphery to match with the said cylinder 2, so that a pentagonal cross-section is most preferred. Therefore, the cylinder 2 may be readily slidable with respect the said shaft 3 for adjustment of its suitable place relative to base portion 1, but can be rotated only together with the shaft 3. The said shaft 3 has a circular cross-section within a certain distance as indicated by 31 and 32 from both the front end and rear end, as best shown in FIG. 2.

Figure 4:
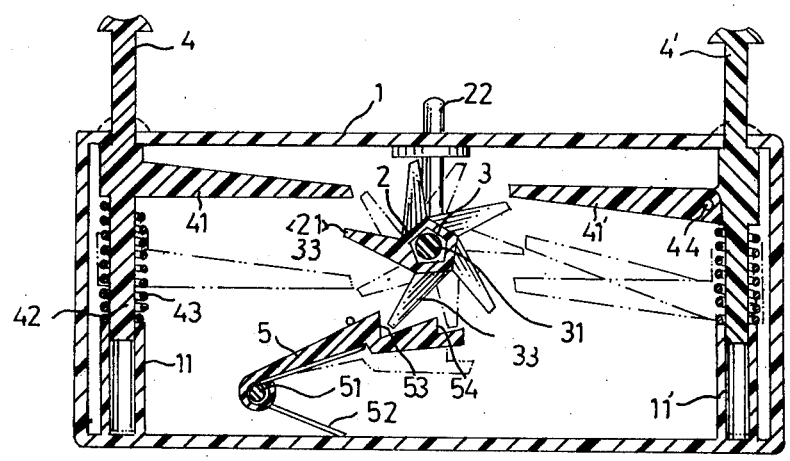
FIG. 4 is an elevation cross-sectional view illustrating the action of the stop means.

The shaft 3 is provided with a multi-bladed plate, preferably a penta-blade 33 at the one end, for example, at front end. A stop means 5 is provided, as best shown in FIG. 4, which consists of a pin 51, a resilient spring 52, and a stepwise arm including a first step 53 and a second step 54. At any time, one and only one blade 33 is stopped at either first step 53 on second step 54, thus the multi-bladed plate along with the said shaft 3 and cylinder 2 are permitted to be rotated in only one direction, i.e. in counter-clockwise as shown in the illustrative embodiment. The shaft 3 has a knob 34 disposed outside of the base portion 1 for manual operation.

The said shaft 3 is also provided with a notched disc 6 disposed just beneath the indicator 7. A notch 61 is formed on the circumference thereof such that its left-side wall is upright whereas its right-side wall is inclined rising to the outer periphery of the disc 6.

On the shaft 3 at least one setting guide member 22 is provided by mounting it with a bushing on the cylinder 21 and the illustrative embodiment shows two. As best shown in FIG. 2, the cylinder 21 can be freely rotated in relation to the setting guide members 22, but will be only slidably moved therewith together, within a distance defined by the slot 14 provided on the cover 15 of said base portion 1.

A plurality of push rods in two series of 4a to 4e and 4'a to 4'e, respectively, are arranged along two longitudinal sides with their lower ends received in the said respective studs 11 and 11'. Each push rod of the first series 4 has a fixed transversly extended arm lever 41, while each push rod of the second series 4' has a pivotably transversly extended arm lever 41' with a pivot pin 44. The section 42 below the arm lever 41 or 41' is surrounded by a compressible spring coil 43.

Figure 5:
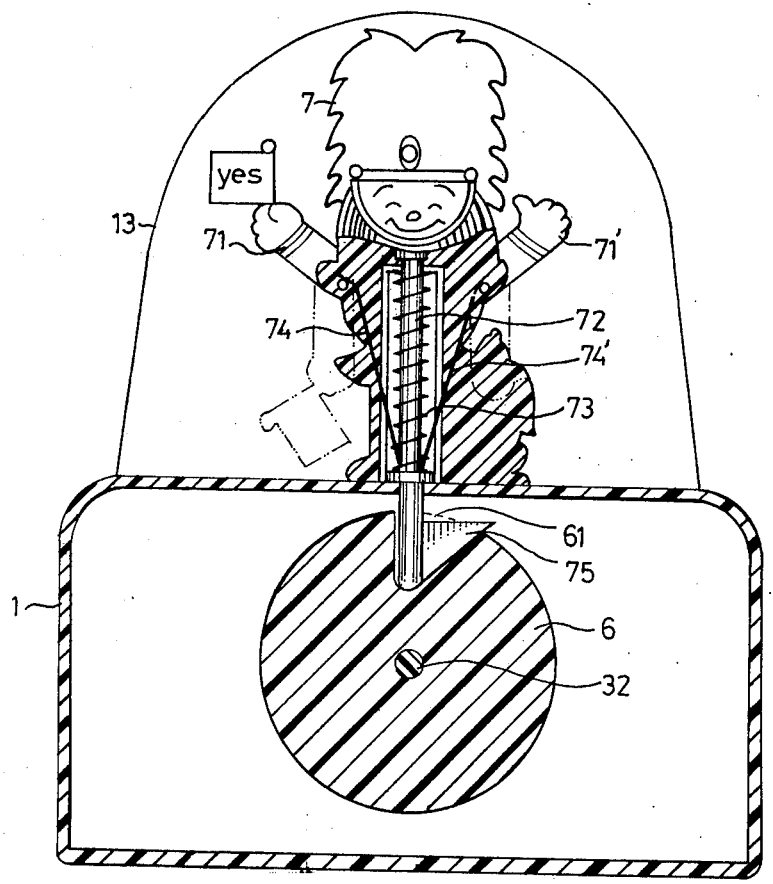
FIG. 5 is an elevation cross-sectional view illustrating the action of the indicator.

The indicator 7 as shown is an illustrative figure with two arms 71 and 71' able to have up-and-down motion for giving an indication of an affirmative answer. As best shown in FIG. 5, the indicator 7 is provided with a post 72 surrounded by a compressible spring coil 73. Two strings 74 and 74' connect the post 72 at appropriate points to the said arms 71 and 71', respectively, in such a manner that when the said post 72 moves downwards and pulls the strings 74 and 74', the arms 71 and 71' will rise. When the post 72 moves upward, the arms 71 and 71' will move down. The post 72 is preferably provided with a triangle block 75 for readily sliding out along the inclined wall of the notch 61.

Figure 6:
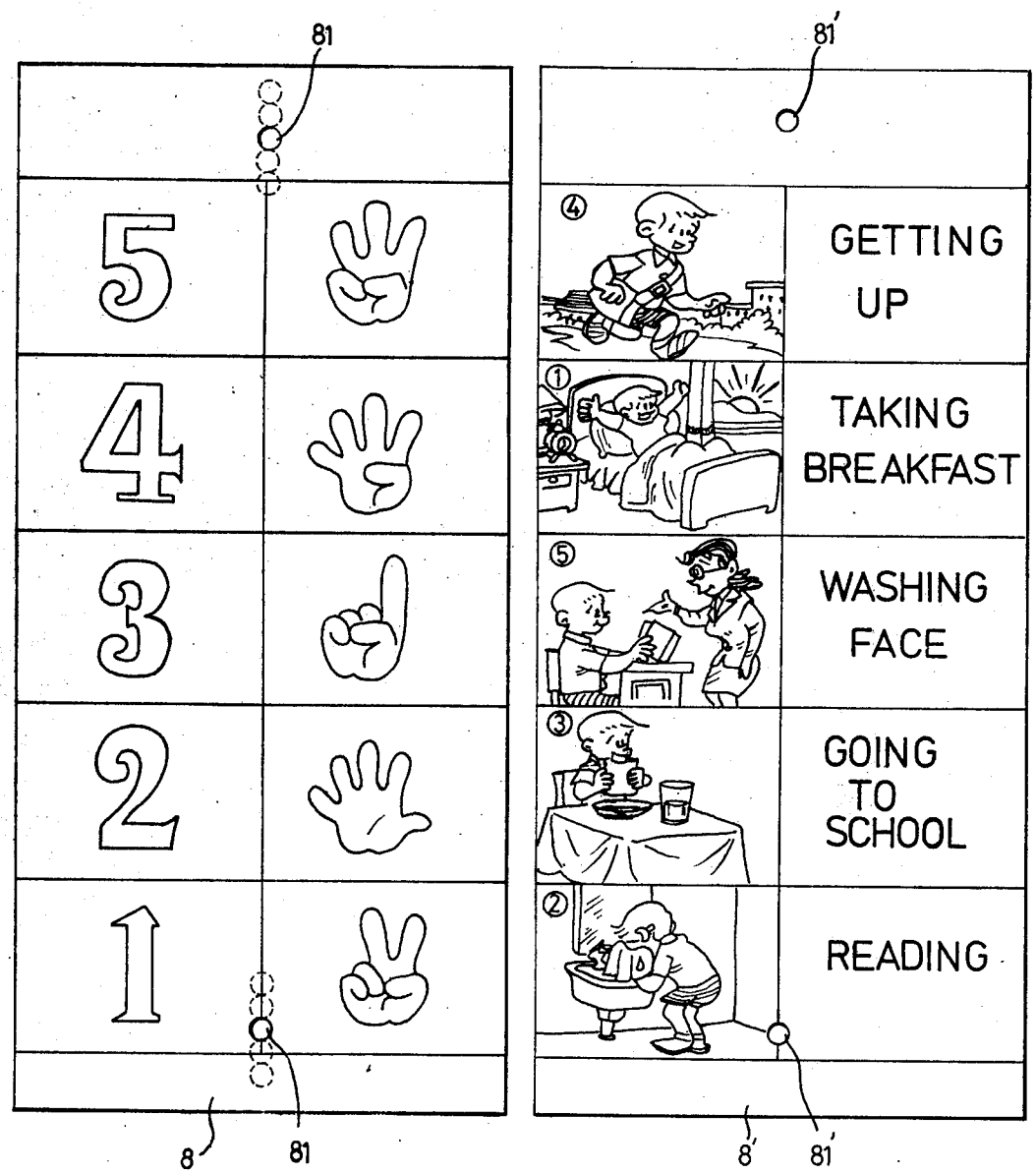
FIG. 6 is a plane view illustrating two examples of the quiz and answer combination card.

As shown in FIG. 6, every card 8 is well designed and printed with a number of questions and answers of variable combinations in sequence. For example, the sequential questions at the left-hand side of cards 8 and 8' are different from each other, and accordingly the sequential answers at the right-hand side of cards 8 and 8' are also different from each other. Each card has at least a setting hole 81 and preferably at least two holes 81 in the upper and lower ends, respectively. In different cards, for example 8 and 8', the level of holes 81 and 81' is varied. The combination of questions and answers will be same on individual cards with the same level of hole 81. If five types of hole levels are formed as shown by the dotted circles, five variations are provided. When the said cylinder 2 is composed of two sections (not shown) which can be individually adjusted in place with respect to the shaft 3, then the two setting guide members 22 are able to mate selectively in separate holes 81 at the upper series and lower series. In the latter case the variation of said combination will be $5 \times 5 = 25$.

In operation, one first of all selects a card 8 and places same on the cover 15 of base portion 1 by inserting in the hole 81 setting guide member 22 and then pushing or pulling the card 8 in place. The position of the cylinder 2 will be set at the same time through the setting guide member 22 and slidably moved with respect to the shaft 3. In this manner, the combination between each protrusion 21 with the respective arm lever 41 or 41' is varied according to the card selected. Then, turn the knob 5 in the direction as indicated by the arrow, till the notch 61 is upright and the arms 71 of FIG. 7 lift.

Now, if the card as completely shown at the left-hand side of FIG. 6 is selected, in order to obtain an indication of an affirmative answer, one must play in sequence. Thus, one must first push the rod 4a corresponding to a question of letter l. As best shown in FIG. 4, the arm lever 41 will press the blade 21 which is just under it to an extent as indicated by the dotted line about 1/10 turn, and the preceding blade 33 is passed from first step 53 and stopped by the second step 54 of stop means 5. Thus, when the rod 4a is released the multi-bladed plate and cylinder 2 will be prevented from turning back.

Next, one must push the rod 4'c corresponding to an answer of "one finger." At this time, the arm lever 41' will pivotably slip over the blade 21 which blocks it on the way, and when the said rod 4'c is released, the multi-bladed plate and accordingly the cylinder 2 will be pulled by 1/10 turn. The blade which was stopped by the second step 54 of stop means 5 is now released and the next blade is in turned stopped by the first step 53 of stop means 5. Therefore, it can be rotated in only one direction, i.e. counter-clockwise.

Subsequently, one must push the rods 4b, 4'a, 4c, 4'e, 4d, 4'd, 4e and 4'b. Only by this correct sequence, the multi-bladed plate as well as the notched disc 6 will turn one cycle, namely, the notch 61 will return to an upright position. The post 72 then drops into said notch 61, and the arms 71 and 71' will lift again to show an indication that the answers are all correct.

When any answer and/or sequence is wrong, then the arm lever 41 or 41' will not act on any blade 21, which means the cylinder 2 as well as notched disc 6 will idle, so that no indication of an affirmative answer appears.

The above embodiment is given only for illustrative purposes and not by the way of limitation. Any variations and modifications evident to those skilled in the art will fall within the scope of the attached claims.

What we claim is:

1. An educational toy comprising an elongated base portion, a cylinder extending longitudinally of the base portion having a plurality of protrusions around its outer periphery extending outwardly in different radial directions, a shaft retained inside said cylinder having a front end and a rear end extending from said cylinder and means permitting it to slide with respect to said cylinder and to rotate together therewith, at least one upwardly extending setting guide member on said cylinder, a first series and a second series of a plurality of push rods longitudinally spaced along said base portion having transverse lever arms extending over the said protrusions on said cylinder, each rod being surrounded by a compressible spring at a section between its lever arm and the bottom of the base portion, a changeable quiz and answer combination card having at least one setting hole for engagement with said at least one guide member for setting the card in place on the said base portion and said cylinder in a position such that said protrusions are in a predetermined arrangement related to said lever arms and card, said card having a plurality of questions associated with said first series of push rods and corresponding answers associated with said second series of push rods but in different order, and indicating means operatively connected with said shaft, whereby only when said first and second series of push rods are sequentially and alternately pushed to match the questions with the correct answers will the lever arms act on said protrusions to rotate said cylinder and shaft sufficiently to cause said indicator to give an indication that all answers are correct.

2. An educational toy according to claim 1, wherein the inner wall of said cylinder and the outer periphery of said shaft retained therein having a matching polygonal shape.

3. An educational toy according to claim 2, wherein said front and rear ends of said shaft extending from ssid cylinder have a circular cross-section.

4. An educational toy according to claim 1, wherein said push rods are received and supported by hollow studs disposed on the bottom of said base portion.

5. An educational toy according to claim 1, wherein said lever arms of said first series of push rods are fixedly fitted on said push rods, and said lever arms of said second series of push rods are pivotably fitted thereon.

6. An educational toy according to claim 1, wherein said shaft is provided with a multi-bladed plate at one of said ends thereof, and stop means having a stepwise member is provided on said base portion for cooperation with said multi-bladed plate to allow same to rotate in only one direction.

7. An educational toy according to claim 6, wherein said multi-bladed plate has five blades.

8. An educational toy according to claim 1, wherein said shaft is provided with a notched disc at one end of said ends thereof, and said indicating means comprises an indicator having a post which is received in the notch of said disc when said notch is turned up-side vertically, said indicator being activated by movement of said post to give an affirmative indication of the answers.

9. An educational toy according to claim 1, wherein the cylinder comprises two separate sections which are individually slidably adjustable.

* * * * *